US006566933B1

(12) United States Patent
Lye

(10) Patent No.: US 6,566,933 B1
(45) Date of Patent: May 20, 2003

(54) SWITCHED CAPACITOR TRANSMITTER PRE-DRIVER

(75) Inventor: Bill Lye, Coquitlam (CA)

(73) Assignee: PMC-Sierra, Inc. (CA)

( * ) Notice: Subject to any disclaimer, the term of this patent is extended or adjusted under 35 U.S.C. 154(b) by 0 days.

(21) Appl. No.: 09/621,964

(22) Filed: Jul. 21, 2000

Related U.S. Application Data

(60) Provisional application No. 60/145,092, filed on Jul. 23, 1999.

(51) Int. Cl.[7] .................................................. G06G 7/18
(52) U.S. Cl. ........................ 327/337; 327/540; 327/576
(58) Field of Search ................................ 327/337, 538, 327/540, 541, 576, 581, 108, 112, 103; 330/255, 262, 263, 264

(56) References Cited

U.S. PATENT DOCUMENTS

| 4,374,357 A | * | 2/1983 | Olesin et al. ................ 323/351 |
| 4,999,634 A | * | 3/1991 | Brazdrum et al. .......... 341/172 |
| 5,057,839 A | * | 10/1991 | Koch .......................... 341/143 |
| 5,220,286 A | * | 6/1993 | Nadeem ........................ 330/9 |
| 5,343,766 A | * | 9/1994 | Lee .......................... 73/862.61 |
| 5,525,920 A | * | 6/1996 | Rakers et al. ................ 327/65 |
| 5,557,187 A | * | 9/1996 | Koch et al. .................... 320/1 |
| 5,751,189 A | * | 5/1998 | Shyu et al. .................... 330/9 |
| 5,847,600 A | * | 12/1998 | Brooks et al. ................. 330/9 |
| 5,847,601 A | * | 12/1998 | Wang ............................ 330/9 |
| 5,953,276 A | * | 9/1999 | Baker ........................ 365/208 |
| 5,974,895 A | * | 11/1999 | Steger et al. ................ 73/769 |
| 6,288,669 B1 | * | 9/2001 | Gata .......................... 341/172 |
| 6,249,240 B1 | * | 6/2002 | Bellaouar ................... 341/172 |

OTHER PUBLICATIONS

D. Chen and R. Waldron, "A Single–Chip 266 Mb/s CMOS Transmitter/Receiver for Serial Data Communications", Proceedings of IEEE Solid–State Circuits Conference, Paper TA 6.3, pp 100–101, Feb., 1993.
A. Fraval and F. Dell'Ova, "A 10–bit 70 MHz 3.3V CMOS 0.5 μm D/A Converter for Video Applications", IEEE Transactions on Consumer Electronics, vol. 41, No. 3, pp. 875–879, Aug., 1995.
J. Bastos, M. Steyaert, and W. Sansen, "A High Yield 12–bit 250–MS/s CMOS D/A Converter", Proceedings of IEEE Custom Integrated Circuits Conference, pp. 431–434, May, 1996.

* cited by examiner

Primary Examiner—Timothy P. Callahan
Assistant Examiner—Hai L. Nguyen
(74) Attorney, Agent, or Firm—Hall, Priddy, Myers & Vande Sande

(57) ABSTRACT

A transmitter pre-driver utilizing discrete-time charge sharing between multiple capacitors to create intermediate voltages. The intermediate voltages are fed into an output driver to produce Class AB and Class A output current flow.

12 Claims, 5 Drawing Sheets

SWITCHED CAPACITOR TRANSMITTER PRE-DRIVER

This application claims the benefit of 60/145,092, filed Jul. 23, 1999.

FIELD

This invention relates generally to a high-speed differential current switches. More specifically, this invention relates to pre-driver techniques for high-speed differential current switches.

BACKGROUND OF THE INVENTION

In conventional data communication systems, integrated circuit designs often depend on having a high-speed differential current switch. Differential signals are used in specialized versions of SCSI, in twisted-pair local area networks, and other high-speed applications. The most common differential switch is the differential pair 10 shown in FIG. 1.

The prior art as depicted in FIG. 1 shows two Metal Oxide Semiconductor (MOS) devices 12 and 14 with their sources connected together (a differential pair), together with a current source 16 supplying current 10 to the common source node of the differential pair. When the gate 20 of MOS 12 is driven to a high voltage and the gate 22 of MOS 14 is driven to a low voltage (V1>V2), any circuitry at the drain 24 of MOS 12 will see I1=I0, while any circuitry at the drain 28 of MOS 14 will see I2=0. If the gate voltages of M1 and M2 are reversed (V2>V1), such that the gate 20 of MOS 12 is driven to a low voltage and the gate 22 of MOS 14 is driven to a high voltage, then at drain 24, I1=0 and at drain 28, I2=I0.

The gate voltages V1 and V2 of MOS 12 and MOS 14 can be driven high and low under control of digital circuitry. This provides high-speed current switching for application in high-speed line drivers, current-mode D/A converters, and PLL charge pumps among others.

The simplest way to drive the gates 20 and 22 of MOS 12 and MOS 14, respectively, is to simply apply complementary rail-to-rail digital signals to them. This system works sufficiently well for a number of low-speed applications but is impractical for more demanding high-speed applications.

Furthermore, this system is susceptible to distortion in the output waveforms I1 and I2. This distortion may result from charge injection across the gate-drain overlap capacitances of MOS 12 and MOS 14, channel charge injection from MOS 12 and MOS 14, and voltage transients on the common drain node. Any voltage transient on the common source node of MOS 12 and MOS 14 results in common-mode currents in I1 and I2 from parasitic capacitance charging and discharging. Voltage transients on this node also modulate the output current of I0.

Traditionally, there are two techniques that can be readily applied, either singly, or in combination, that may significantly reduce the distortion described above. The first is to apply gate voltages to MOS 12 and MOS 14 such that MOS 12 is turned on before MOS 14 is shut off (and vice-versa).

The second technique is to minimize the difference between voltages applied to MOS 12 and MOS 14 using a pre-driver. This minimizes gate/drain overlap charge injection and voltage transients on the common source node, thereby minimizing the common-mode current transients. In general, there are four methods by which the second technique may be carried out. Four pre-driver circuits showing four separate methods to generate reduced-swing gate voltages for MOS 12 and MOS 14 are shown in FIGS. 2a to 2d.

Referring to FIG. 2a, the first method uses resistive dividers 32 and 34 on the outputs of two standard CMOS inverters 36 and 38, respectively, to produce two voltages V1 and V2 between the rails. The resistors of the resistive dividers 32 and 34 are generally approximated using MOS transistors, and as a result the output voltages V1 and V2 are usually poorly controlled over process variations, temperature, and power supply voltage.

Referring to FIG. 2b, the second method uses a second differential pair 40 and 42 driven into a cross-coupled latch 44 to produce the two gate voltages V1 and V2. Similar to the first method, the voltages V1 and V2 are determined by the characteristics of MOS transistors, and are usually poorly controlled.

Referring to FIG. 2c, the third method is similar to the second, using a differential pair 46 and 48 but replacing the cross-coupled latch with resistors 50 and 52. As resistors have replaced the MOS transistors of the second method, the resistor, current source and gate voltages can potentially be well controlled. However, the use of resistors consumes a relatively large quantity of power.

Referring to FIG. 2d, the fourth method uses amplifiers 54 and 56 to buffer separately generated reference voltages VREF1 and VREF2, then using a switching matrix 58 to connect the buffered voltages V1 and V2 to the gates of MOS 12 and MOS 14.

The first three methods (see FIGS. 2a, 2b and 2c) all suffer from high power consumption. This is a result of having to drive the gate capacitances of MOS 12 and MOS 14: as the current I0 becomes larger, MOS 12 and MOS 14 become wider, and the gate capacitances of MOS 12 and MOS 14 become larger. As a result, the effective output resistance from resistive dividers 32 and 34, resistors 50 and 52 and the cross-coupled latch 44 must be reduced in order to keep the signal slew rate high and therefore the circuit speed high. The output voltages V1 and V2 are generated by driving a current through the output resistance (resistive dividers 32 and 34, resistors 50 and 52 and the cross-coupled latch 44), thus, the standing current in the system rises and therefore so does the power dissipation.

Similarly, if the frequency of switching increases while the dimensions of MOS 12 and MOS 14 are kept constant, the time constant of the pre-driver output must go down, therefore its output resistance must go down, again requiring an increase in standing current. As a result, the power dissipated in the pre-driver is roughly proportional both to I0 and to the switching frequency.

The fourth method also requires large standing currents, but for different reasons than described for the first three methods. By separately generating the voltages VREF1 and VREF2 and then buffering them on two holding capacitors, the amplifiers 54 and 56 only have to provide current to replenish charge drawn from the capacitors during switching.

The major shortcoming of the fourth method is that the required current out of the amplifiers 54 and 56 when transmitting data is data transition density dependent. Therefore, during periods of high transition density, on average more charge will be pulled from the holding capacitors than during low transition density periods. To avoid introducing data-dependent jitter on the outputs V1 and V2, the amplifiers 54 and 56 need to replenish the charge within one sample time. As a result, the required amplifier bandwidth is quite large, which usually requires a single-stage amplifier structure with a lot of standing current. To reduce the standing current, a lower-power 2-stage amplifier may be used, but this approach is not preferred due to the difficulty in compensating that amplifier and still getting the required bandwidth. An alternate approach is to reduce the size of the holding capacitors, this will make the 2-stage amplifier compensation easier, but will result in unwanted transient signals on the buffer outputs. A further alternate approach is to add a low-impedance stage to the 2-stage amplifiers' output that would reduce the transient effects, but will also add standing current. Therefore, the fourth method (FIG. 2d) results in standing currents comparable to the first three methods (FIGS. 2a–2c), with similar power dissipation.

Clearly, as the speed of a transmitter goes higher, the power penalty of constructing a high-current off-chip transmitter pre-driver using these techniques becomes prohibitive.

It is, therefore, an object of this invention to provide an improved transmitter pre-driver that minimizes power dissipation.

It is a further object of this invention to provide a transmitter pre-driver that has little standing current and continues to operate at high frequencies.

SUMMARY OF THE INVENTION

According to the invention there is provided a new and improved transmitter pre-driver comprising a voltage regulator used in conjunction with a driver circuit.

The voltage regulator comprises a plurality of capacitors and switches. The voltage regulator operates by generating at least one regulated voltage by charge sharing between one or more capacitors of the voltage regulator, and the gate capacitances of the driver circuit. The charge sharing is performed using transmitted data as a clock where the switches of the voltage regulator are driven by the transmitted data.

The driver circuit comprises two current sources and two differential pairs, with each differential pair having two Metal Oxide Semiconductor (MOS) devices. Each MOS device of the differential pair has a common current source. The driver circuit takes the regulated voltage, or voltages, from the voltage regulator and outputs an output current flow. The output current flow may be a Class AB (current source/sink) output pair or, alternatively, a Class A output. The output from the driver circuit may in turn be driven off-chip through resistors to form a voltage.

Other objects and advantages of the invention will become clear from the following detailed description of the preferred embodiment, which is presented by way of illustration only and without limiting the scope of the invention to the details thereof.

BRIEF DESCRIPTION OF THE DRAWINGS

Many objects and advantages of the present invention will be apparent to those of ordinary skill in the art when this specification is read in conjunction with the attached drawings wherein like reference numerals are applied to like elements and wherein.

DETAILED DESCRIPTION

Figure 1:
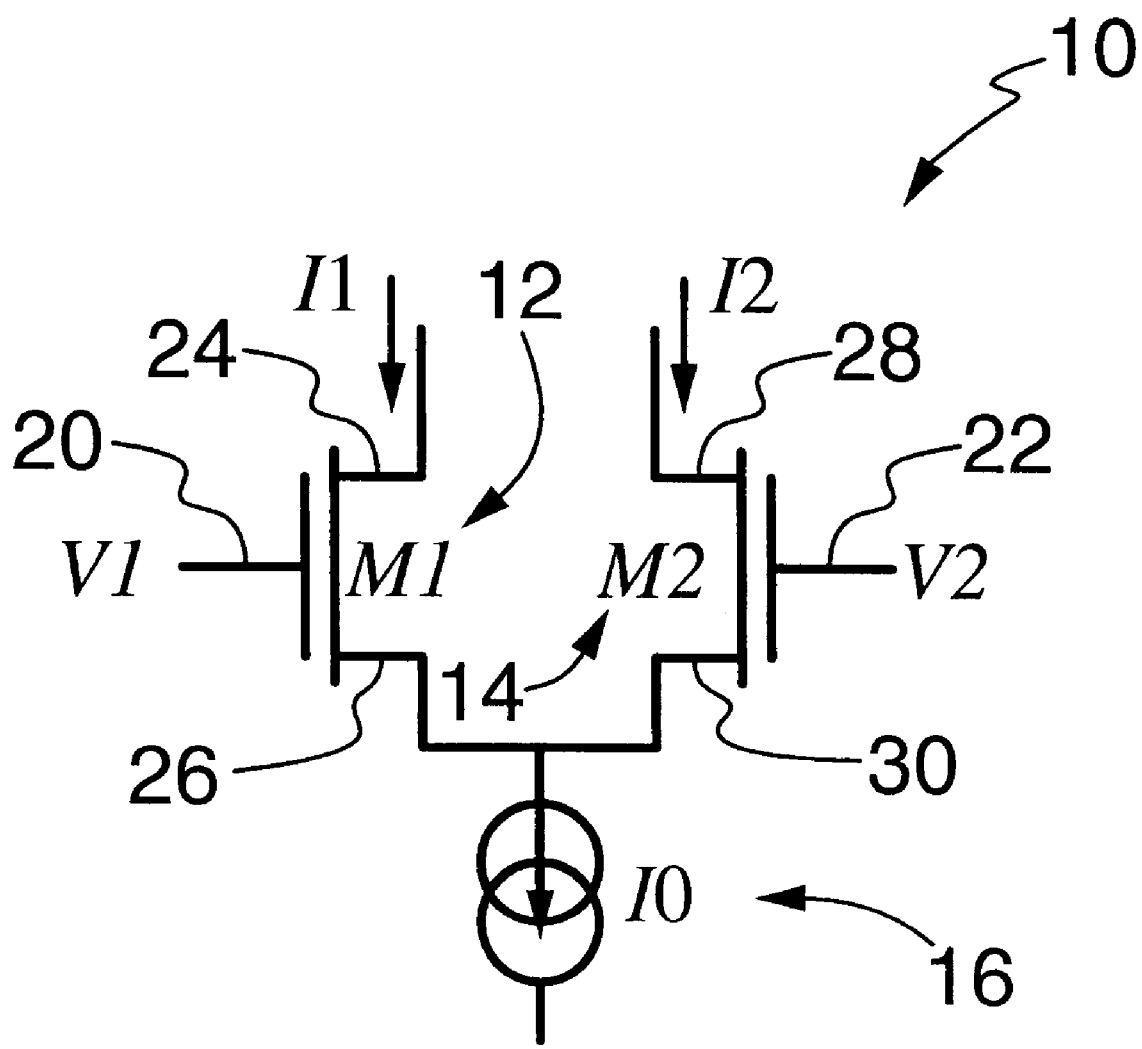
FIG. 1 is a circuit diagram of a differential pair and a current source.
Figure 2A:
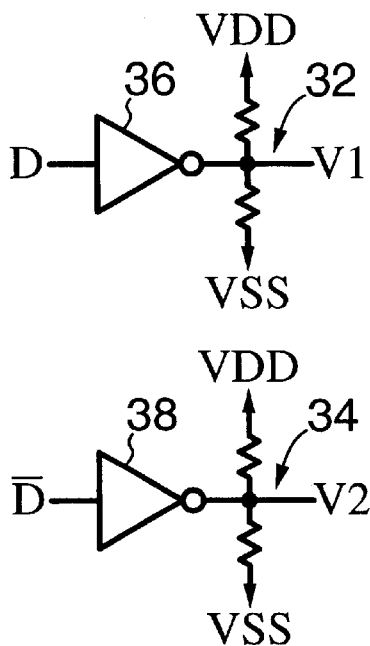
FIGS. 2a to 2d are circuit diagrams of four different prior art pre-driver circuits.
Figure 2B:
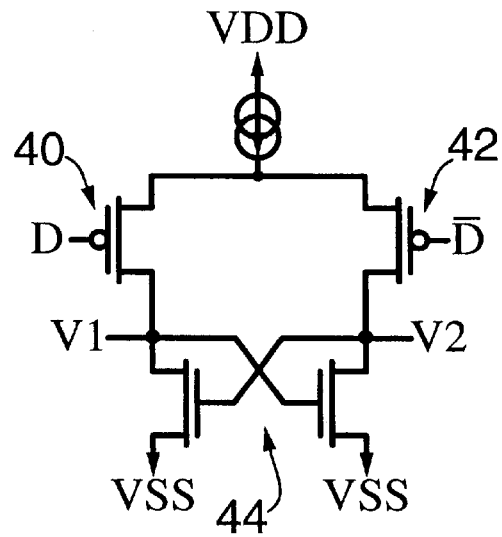
Figure 2C:
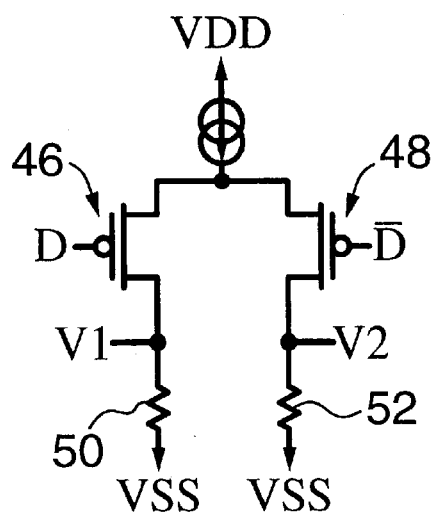
Figure 2D:
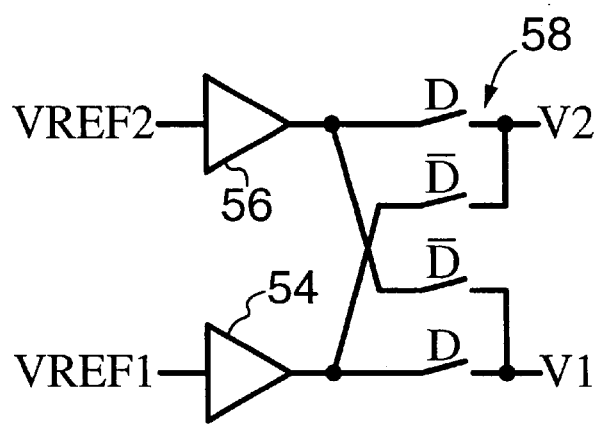
Figure 3:
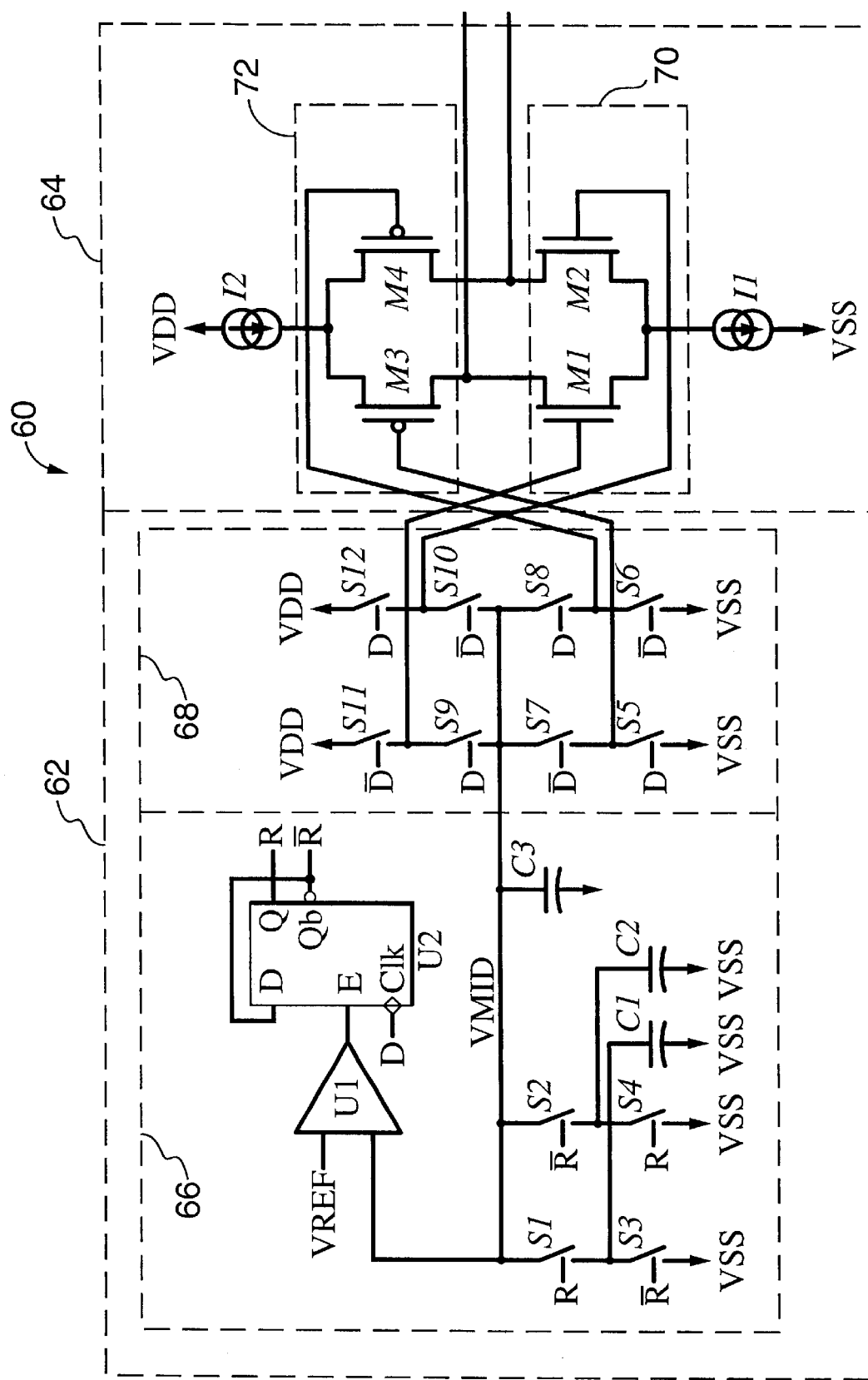
FIG. 3 is a circuit diagram of an embodiment of the transmitter pre-driver of this invention having a discrete time voltage regulator.

Referring to FIG. 3, an embodiment of the transmitter pre-driver 60 of this invention is shown comprising a voltage regulator 62 and gate capacitances of a driver circuit 64. The voltage regulator 62 includes a discrete time regulator loop 66 and a switch array 68.

The discrete time regulator loop 66 comprises a comparator U1, a double-edge triggered flip-flop U2 having a data signal D as a clock input, switches S1, S2, S3 and S4, and two matched capacitors C1 and C2. The discrete time regulator loop 66 operates to regulate the mid-rail voltage VMID so as to be approximately equal to a reference voltage VREF.

The driver circuit 64 comprises Metal Oxide Semiconductor (MOS) devices M1, M2, M3 and M4 and current sources I1 and I2 connected to MOS devices M1 and M2, and M3 and M4 respectively. Within the embodiment depicted in FIG. 3, the MOS devices M1 and M2 may be NMOS transistors and the MOS devices M3 and M4 may be PMOS transistors. However, the MOS devices of the driver circuit 64 may be any MOS devices having appropriate gate capacitances and capable of generating the appropriate output current flow.

The combination of NMOS transistors M1 and M2 form an NMOS differential pair 70. Similarly, PMOS transistors M3 and M4 form a PMOS differential pair 72. The driver circuit 64 is coupled to the mid-rail voltage VMID of the voltage regulator 62 through switches S5, S6, S7, S8, S9, S10, S11 and S12. A capacitor C3 acts as a large "pool of charge" to minimize the ripple on the mid-rail voltage VMID. The NMOS differential pair 70 has its inputs driven between the mid-rail voltage VMID and the rail voltage VDD, while the PMOS differential pair 72 has its inputs driven between the rail voltage VSS and the mid-rail voltage VMID. The outputs from the differential pairs 70 and 72 form a Class AB (current source/sink) output pair that may be driven off-chip through resistors to form a voltage.

In operation, the comparator U1 continuously monitors the mid-rail voltage VMID and compares it to the reference voltage VREF. If the mid-rail voltage VMID is greater than the reference voltage VREF, the output R from the comparator U1 goes HIGH. This output is fed into the input E of the double-edge triggered flip-flop (DETFF) U2, causing the R to toggle the next time that its clock signal is triggered. The DETFF U2 has its clock input connected to the data input signal D. As a result, R toggles on every edge of the data signal D when the mid-rail voltage VMID is greater than the reference voltage VREF. The true and complement outputs, Q and $Q_b$, of the DETFF U2 are applied to the control inputs R and $\overline{R}$ of switches S1 to S4. When R goes HIGH, capacitor C1 that had been connected to the rail voltage VSS, is connected to the mid-rail voltage VMID, causing charge sharing between capacitors C1 and C3, and pulling the mid-rail voltage VMID down by a voltage given by EQ,1:

$$\Delta V = VMID \cdot \frac{C1}{C1 + C3}$$

$$\cong VREF \cdot \frac{C1}{C1+C3}$$

Figure 4:
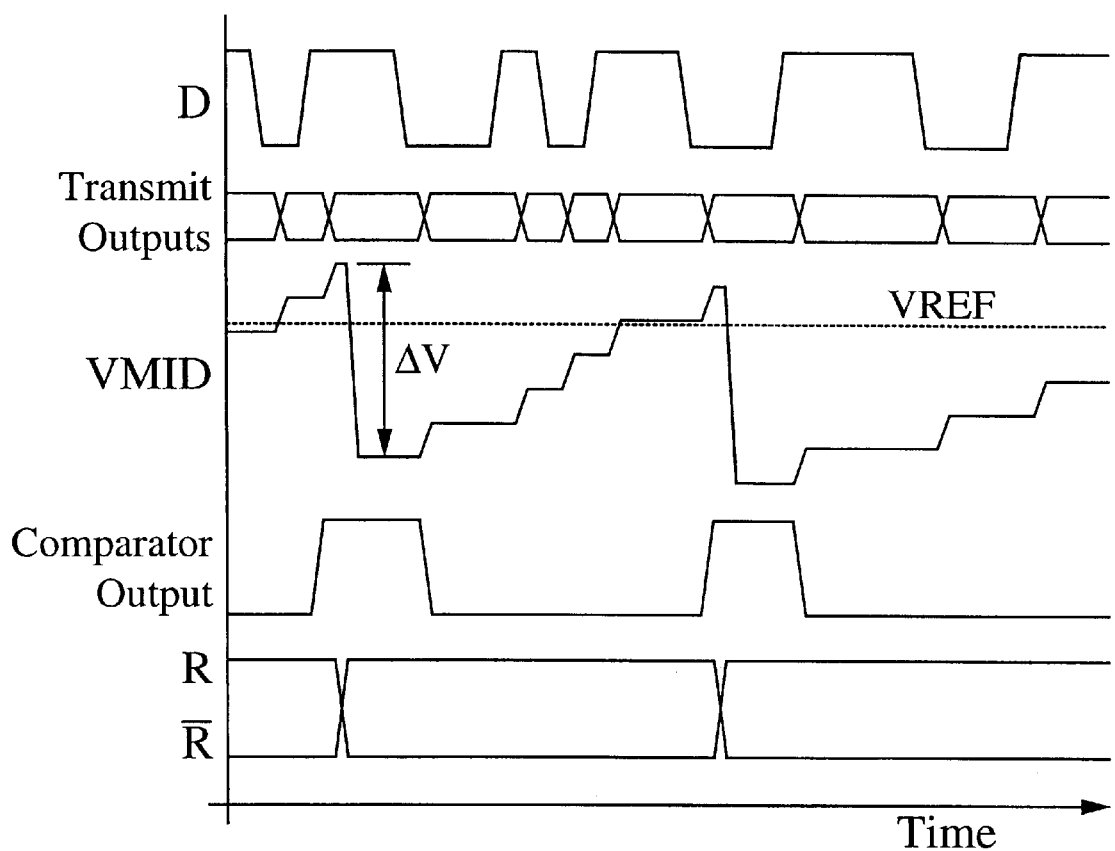
FIG. 4 is a timing diagram for the pre-driver with a voltage regulator of FIG. 3.

At the same time, the capacitor C2 that had been connected to the mid-rail voltage VMID, is shorted to the rail voltage VSS. When R goes LOW, charge sharing occurs between capacitors C2 and C3, again pulling the mid-rail voltage VMID down by ΔV, and capacitor C1 is shorted to the rail voltage VSS. As a result, when the data input D toggles, if the mid-rail voltage VMID is higher than the reference voltage VREF, then the mid-rail voltage VMID will be pulled towards the rail voltage VSS by ΔV. So long as the voltage that the charge sharing with the NMOS differential pair 70 and the PMOS differential pair 72 is smaller than ΔV, the voltage regulator 62 will be able to maintain the mid-rail voltage VMID close to the reference voltage VREF, and the maximum error between the mid-rail voltage VMID and the reference voltage VREF will be constrained to be less than ΔV. FIG. 4 shows a timing diagram of the operation of the discrete time regulator loop 66.

If edge-dependent jitter of the mid-rail voltage VMID may be ignored, then the DETFF U2 may be changed to a single-edge triggered flip-flop (SETFF). This change results in a simplified circuit implementation that would only apply a correction to the mid-rail voltage VMID either on every rising edge, or every falling edge, of the data input D.

If the mid-rail voltage VMID were left to float by removing the discrete time regulator loop 66, then the voltage on capacitor C3 would eventually reach an equilibrium voltage of VMID'. The equilibrium voltage VMID' is the voltage at which the effect of charge sharing the rail voltage VSS on the gate capacitances of MOS devices M1 and M2 and the rail voltage VDD on the gate capacitances of MOS devices M3 and M4 results in no change of the voltage on capacitor C3. If the equilibrium voltage VMID' could be guaranteed to be acceptable across all process variations, temperatures, and power supply variations, the voltage regulator 62 would not be required. However, the gate capacitances of the MOS devices M1, M2, M3 and M4 are dependent on the gate voltage, therefore, there is wide process, voltage, and temperature-dependent range on the equilibrium voltage VMID'. If the desired mid-rail voltage VMID is lower than the minimum equilibrium voltage VMID', the discrete time regulator loop 66 is all that is required. However, if the desired value of the mid-rail voltage VMID is greater than the maximum equilibrium voltage VMID', then it is necessary to connect switches S3 and S4 to the rail voltage VDD instead of the rail voltage VSS and swap the inputs to the comparator U1, thereby pulling the mid-rail voltage VMID towards the rail voltage VDD instead of towards the rail voltage VSS. If the desired mid-rail voltage VMID is within the range of the equilibrium voltage VMID', then both a pull-up and a pull-down regulator will be required.

In particular circuit implementations, it is often necessary to be concerned about the start-up of the circuit and the long-tern stability of the mid-rail voltage VMID in the absence of data transitions as the regulator loop only operates on every data transition, Therefore, in the absence of data transitions, VMID is held on the capacitor C3 and may drift due to parasitic effects such as leakage. To compensate for the drift, a very weak continuous-time feedback path in parallel with the discrete-time regulator path may be added to the circuit. The continuous-time feedback path will be significantly weaker (less than 1%) than the discrete-time regulator path, therefore its high-speed dynamic behavior can be ignored when analyzing the circuit. The effect of the continuous-time feedback path will only become significant during periods of no data transitions, or during start-up of the circuit, before any data transitions have occurred, The implementation of the comparator U1 is designed to dissipate minimal static power and yet operate at high speed. A dynamic (or clocked) comparator is one way of keeping the static power low yet maintaining a high speed of operation.

Figure 5:
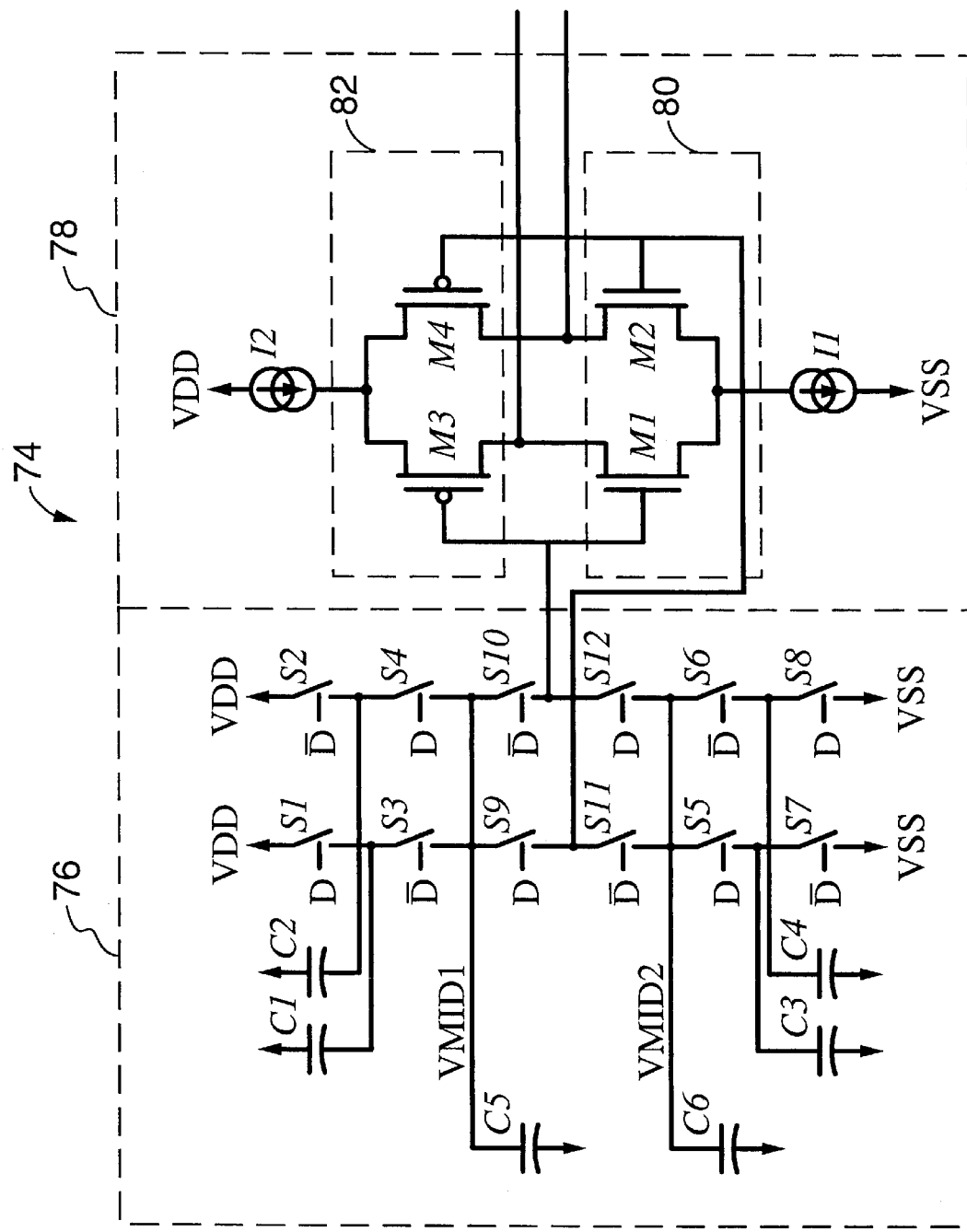
FIG. 5 is a circuit diagram of an alternate embodiment of the transmitter pre-driver of this invention without a regulator loop.

Referring to FIG. 5, an alternate embodiment of a transmitter pre-driver 74 is shown. The transmitter pre-driver 74 comprises a voltage regulator 76 and gate capacitances of a driver circuit 78. It should be noted that all of the switches (S1 to S12) are driven by either the true or complement data input signals, D and $\overline{D}$ respectively.

The voltage regulator 76 comprises switches S1, S2, S3, S4, S5, S6, S7, and S8, matched capacitors C1 and C2, and matched capacitors C3 and C4.

The driver circuit 78 comprises MOS devices M1, M2, M3 and M4 and current sources I1 and I2 connected to MOS devices M1 and M2, and M3 and M4 respectively. Within the embodiment depicted in FIG. 5, the MOS devices M1 and M2 may be NMOS transistors and the MOS devices M3 and M4 may be PMOS transistors. However, the MOS devices of the driver circuit 78 may be any MOS devices having appropriate gate capacitances and capable of generating the appropriate output current flow.

The combination of NMOS transistors M1 and M2 form an NMOS differential pair 80. Similarly, PMOS transistors M3 and M4 form a PMOS differential pair 82. The transmitter pre-driver 74 utilizes two mid-rail voltages VMID1 and VMID2 at the output from the voltage regulator 76. Mid-rail voltages VMID1 and VMID2 are filtered by capacitors C5 and C6 that form large "pools of charge". The mid-rail voltages VMID1 and VMID2 are coupled to the driver circuit 78 by switches S9, S10, S11 and S12.

The gate inputs of the two differential pairs 80 and 82 are driven in parallel between the mid-rail voltages VMID1 and VMID2. The outputs from the differential pairs 80 and 82 form an output current flow. The output current flow may be a Class AB output pair or a Class A output. The output current flow of the driver circuit 78 may be driven off-chip through resistors, producing a voltage output.

The transmitter pre-driver 74 operates by sharing of charge between the gate capacitances of the driver circuit 78 and one or more of the capacitors C1 to C6 of the voltage regulator 76. During a positive transition of the data input D, capacitor C1 charged to the rail voltage VDD, shares charge with capacitor C5 charged to the mid-rail voltage VMID1, and the gate capacitances of MOS devices M1 and M3, charged to mid-rail voltage VMID2, to give a new value of the mid-rail voltage VMID1. Similarly, capacitor C3 charged to rail voltage VSS, shares charge with capacitor C6 charged to the mid-rail voltage VMID2, and the gate capacitances of MOS devices M2 and M4 charged to the mid-rail voltage VMID1, resulting in a new value of the mid-rail voltage VMID1. Capacitor C2 is charged to rail voltage VDD, while capacitor C4 is charged to rail voltage VSS.

During a negative transition of the data input $\overline{D}$, capacitors C2 and C5, and the gate capacitances of the MOS devices M2 and M4 share charge to produce the mid-rail voltage VMID1, while capacitors C4 and C6, and the gate capacitances of MOS devices M1 and M3 share charge to produce the mid-rail voltage VMID2.

The resulting capacitive voltage divider will eventually reach equilibrium voltages. Taking Cx as the sum of the gate capacitances of MOS devices M1 and M3, the equilibrium points are given by EQ.2:

$$VMID1 \cong \frac{1/C3 + 1/Cx}{1/C3 + 1/Cx + 1/C1}$$

$$VMID2 \cong \frac{1/C3}{1/C3 + 1/Cx + 1/C1}$$

Examining the expressions for the mid-rail voltages VMID1 and VMID2, we can see that the expressions are in the form of a capacitance divider formula, as a switched-capacitor divider is created between the VDD and VSS rails.

The approximations of EQ.2 can be made because Cx remains approximately constant. Even though the gate capacitances of MOS devices M1, M2, M3 and M4 are operating point dependent, MOS device M1 is on when MOS device M3 is off, and vice versa. At least one MOS device is always on, and the voltage difference between the mid-rail voltages VMID1 and VMID2 is smaller than either the difference between the rail voltage VDD and the mid-rail voltage VMID1 or, the mid-rail voltage VMID2 and the rail voltage VSS, therefore, the capacitance Cx remains approximately constant.

As in the first embodiment, during periods of no data transitions or during startup, the mid-rail voltages VMID1 and VMID2 float on capacitors C5 and C6, and may therefore drift with leakage. A resistor divider between the VDD and VSS rails having resistor values determined to give the mid-rail voltages VMID1 and VMID2 the same as for the capacitance divider equations of EQ.2, may be connected in parallel with the discrete-time capacitive divider, to hold the mid-rail voltages VMID1 and VMID2 and prevent drift. This resistor divider can be made much weaker than the capacitance divider to minimize power dissipation and to simplify analysis of the system.

Unlike the first embodiment, no explicit regulation loop is required for this embodiment. In the first embodiment, the equilibrium voltage VMID' was determined by the gate capacitances of differential pairs 70 and 72. The dimensions, and therefore the gate capacitances of the differential pairs are often determined by other circuit requirements, therefore, there is generally little control over what the final equilibrium voltage VMID' will be without introducing the regulation loop. However, the second embodiment, utilizes capacitors C1 and C2, and C3 and C4, to set the mid-rail voltages VMID1 and VMID2 independently of the gate capacitances of the differential pairs 80 and 82. If the capacitors C1, C2, C3 and C4 are constructed of gate capacitances and matched to the MOS devices M1, M2, M3 and M4, a fair amount of control exists, over the final mid-rail voltages VMID1 and VMID2.

This second embodiment does not have the explicit discrete time regulation loop 66 of the first embodiment (see FIG. 3), and there are fewer circuit elements to limit the speed of operation. Therefore, the second embodiment has the potential to operate at much higher speeds than the first.

The transmitter pre-driver circuit 74 may be modified to operate in different applications. Referring again to FIG. 5, the transmitter pre-driver circuit 74 as shown has a Class AB output stage, suitable for implementing an LVDS transmitter. By removing the MOS devices M1 and M2 and current source I1, and adjusting capacitors C1, C2, C3 and C4, the output from the driver circuit becomes a Class A current source output, suitable for implementing a GLVDS-compatible transmitter. Alternatively, by removing the MOS devices M3 and M4, and current source I2, and adjusting capacitors C1, C2, C3 and C4, the output from the driver circuit becomes a Class A current sink output, suitable for implementing a PECL transmitter.

Furthermore, the transmitter pre-driver circuit 74 may be optimized by utilizing a suitable low-impedance voltage source that provides an acceptable mid-rail voltage VMID1 or VMID2. If a low-impedance voltage source is introduced to provide the mid-rail voltage VMID1, switches S1, S2, S3 and S4 and capacitors C1 and C2 may be removed, simplifying the circuit. Similarly, if a low-impedance voltage source is introduced to provide the mid-rail voltage VMID2, switches S5, S6, S7 and S8, and capacitors C3 and C4 may be removed, simplifying the circuit. For example, when implementing an LVDS transmitter with a common-mode output voltage of 1.2V, VMID1 will likely be approximately 1.6V while VMID2 will be approximately 0.8V. In a 3.3V/1.8V dual-voltage technology, the 1.8V VDD rail is close enough to 1.6V to be a suitable VMID1, so switches S1, S2, S3 and S4 and capacitors C1 and C2 can be removed and capacitors C3 and C4 can be adjusted to keep VMID2 at 0.8V. In this situation, the control voltages for S5, S6, S7 and S8, and switches S9, S10, S11 and S12 can also be driven off the 1.8V rail, drastically reducing the dynamic power dissipation of the circuit.

Accordingly, while this invention has been described with reference to illustrative embodiments, this description is not intended to be construed in a limiting sense various modifications of the illustrative embodiments, as well as other embodiments of the invention, will be apparent to persons skilled in the art upon reference to this description. For example, there are several possible circuit implementations of the functions embodied by the comparator U1 and the double-edge triggered flip-flop U2. For example, it is possible to combine U1 and U2 together into a single dynamic circuit whose output toggles whenever the data transitions and VMID is higher than VREF. Several other such implementations are possible.

It is therefore contemplated that the appended claims will cover any such modifications or embodiments as fall within the true scope of the invention.

What is claimed is:

1. A transmitter pre-driver operating between rail supply lines having voltages VSS and VDD, respectively, comprising:

(a) a first mid-voltage rail of voltage VMID1, VMID1 having a voltage value intermediate voltages VSS and VDD of said rail supply lines;

(b) a regulator circuit coupled to said rail supply lines, said regulator circuit having a plurality of capacitors and a matrix of regulator switches coupled between said capacitors, said mid-voltage rail and sail rail supply lines, said regulator switches operative to switch in response to digital data signals to permit charge to be transferred between said capacitors so as to regulate a voltage of said first mid-voltage rail, said regulator circuit including a regulator loop operative to regulate voltage on said first voltage rail to be substantially equal to that of a reference voltage;

(c) a matrix of connector switches coupled between said mid-voltage rail and a plurality of inputs to said driver circuit; and (d) means for receiving a plurality of digital data signals wherein each signal designates a selected one of said plurality of inputs;

wherein said switches operatively couple said mid-voltage rail to a first input of said plurality of inputs in response to a first digital data signal designating said first input and to a second input of said plurality of inputs in response to a second digital data signal designating said second input.

2. The transmitter pre-driver according to claim 1, wherein said regulator loop comprises a comparator and a single-edge triggered flip flop and wherein outputs of said flip-flop trigger said regulator switches.

3. The transmitter pre-driver according to claim 1, wherein said regulator loop comprises a comparator and a double-edge triggered flip-flip coupled to an output of said comparator and wherein outputs of said flip-flop trigger said regulator switches.

4. A transmitter pre-driver according to claim 1, further including a second voltage rail of voltage VMID2 having a voltage value intermediate that of one of VMID1 and VSS and VMID1 and VDD, but closer in value to VMID1, and coupled to a low impedance voltage source and, in response to the data signals, to one of a plurality of inputs of a driver through said connector matrix of switches.

5. A transmitter pre-driver according to claim 1, including a smoothing capacitor coupled at one end to said first mid-voltage rail of voltage VMID1, and at another end to one of said rail supply lines and operative to store a pool of charge thereon and to minimize ripple on said voltage rail.

6. The transmitter pre-driver according to claim 5, further including:
   (a) a second voltage rail of voltage VMID2 of a value between one of VSS and VMID1 and VDD and VMID1 and closer to VMID1; and
   wherein said plurality of capacitors include voltage setting capacitors C1, C2, C3 and C4, which in combination with said smoothing capacitor set voltages of said first and second voltage rails having voltages VMID1 and VMID2, respectively, and connector switches responsive to data signals and the complement of said data signals to selectively connect said capacitors to said rail supply lines, and to said voltage rails VMID1 and VMID2.

7. A transmitter pre-driver according to claim 5, wherein capacitors C1 and C3 are matched with capacitors C2 and C4, respectively.

8. A method of driving a capacitive load with a digital signal voltage substantially less in voltage than a voltage from power supply rails applied to a circuit having said capacitive load, comprising:
   (a) generating locally a first locally generated voltage level through sharing charge stored on said capacitive load and one or more internal capacitors, said one or more internal capacitors being connected to one or more externally provided low-impedance voltage sources;
   (b) connecting the capacitive load to a first of a locally generated voltage source, an externally provided low-impedance voltage source and a second locally generated voltage source in response to an externally supplied digital signal designating the first voltage source and to a second of the locally generated voltage source, the externally provided low-impedance voltage source and the second locally generated voltage source in response to an externally supplied digital signal designating the second voltage source; and
   (c) regulating said first locally generated voltage to be substantially equal to an externally provided reference voltage utilizing a regulator loop.

9. The method according to claim 8, wherein said externally provided low impedance voltage source is one of said power supply rails.

10. The method according to claim 8, including smoothing a voltage on said first locally generated voltage level with a smoothing capacitor.

11. The method according to claim 4, wherein the said regulator loop comprises a comparator and a double-edge triggered flip-flop and wherein outputs of said flip-flop trigger said regulator switches.

12. The method according to claim 4, wherein said regulator loop comprises a comparator and a single-edge triggered flip-flop and wherein outputs of said flip-flop trigger said regulator switches.

* * * * *

UNITED STATES PATENT AND TRADEMARK OFFICE
CERTIFICATE OF CORRECTION

PATENT NO. : 6,566,933 B1  
DATED : May 20, 2003  
INVENTOR(S) : Bill Lye

It is certified that error appears in the above-identified patent and that said Letters Patent is hereby corrected as shown below:

Column 1,  
Line 25, delete "10", and insert -- IO --.

Column 4,  
Line 63, delete "EQ,1", and insert -- EQ.1 --.

Column 8,  
Line 27, after "sense", insert -- . --.  
Line 27, delete "various", and insert -- Various --.

Signed and Sealed this

Thirtieth Day of September, 2003

JAMES E. ROGAN  
*Director of the United States Patent and Trademark Office*